(12) United States Patent
Jasik et al.

(10) Patent No.: US 8,255,374 B2
(45) Date of Patent: Aug. 28, 2012

(54) METHOD AND SYSTEM FOR SELECTING AMONGST A PLURALITY OF PROCESSES TO SEND A MESSAGE

(75) Inventors: Benji Jasik, San Francisco, CA (US); Simon Fell, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 694 days.

(21) Appl. No.: 11/849,036

(22) Filed: Aug. 31, 2007

(65) Prior Publication Data

US 2008/0082586 A1 Apr. 3, 2008

Related U.S. Application Data

(60) Provisional application No. 60/827,871, filed on Oct. 2, 2006.

(51) Int. Cl.
G06F 17/30 (2006.01)
(52) U.S. Cl. .......................... 707/705; 707/769; 707/770
(58) Field of Classification Search .............. 707/3, 10, 707/200, 999.003, 999.01, 999.2, 705, 770, 707/769
See application file for complete search history.

(56) References Cited

U.S. PATENT DOCUMENTS

| | | | |
|---|---|---|---|
| 6,567,504 B1 * | 5/2003 | Kercheval et al. | 379/69 |
| 6,892,210 B1 * | 5/2005 | Erickson et al. | 1/1 |
| 6,954,737 B2 * | 10/2005 | Kalantar et al. | 705/50 |
| 7,080,051 B1 * | 7/2006 | Crawford | 705/400 |
| 7,099,444 B1 * | 8/2006 | Russell | 379/142.02 |
| 7,184,524 B2 * | 2/2007 | Digate et al. | 379/88.17 |
| 7,209,916 B1 * | 4/2007 | Seshadri et al. | 707/3 |
| 7,313,575 B2 * | 12/2007 | Carr et al. | 707/104.1 |
| 7,555,287 B1 * | 6/2009 | Heinonen et al. | 455/412.1 |
| 7,668,919 B2 * | 2/2010 | Spielman et al. | 709/206 |
| 2002/0143819 A1 * | 10/2002 | Han et al. | 707/513 |
| 2003/0065827 A1 * | 4/2003 | Skufca et al. | 709/315 |
| 2003/0088534 A1 * | 5/2003 | Kalantar et al. | 706/50 |
| 2003/0233404 A1 | 12/2003 | Hopkins | 709/203 |
| 2004/0202132 A1 * | 10/2004 | Heinonen et al. | 370/331 |
| 2004/0210909 A1 | 10/2004 | Dominguez, Jr. et al. | 719/316 |
| 2004/0260820 A1 * | 12/2004 | Bearman | 709/229 |
| 2005/0065925 A1 | 3/2005 | Weissman et al. | 707/4 |
| 2005/0204047 A1 * | 9/2005 | Mitchell et al. | 709/228 |
| 2005/0223022 A1 | 10/2005 | Weissman et al. | 707/102 |
| 2005/0223367 A1 * | 10/2005 | Smith et al. | 717/128 |
| 2005/0283478 A1 | 12/2005 | Choi et al. | 707/9 |
| 2006/0015603 A1 * | 1/2006 | Jakobson et al. | 709/223 |
| 2006/0075407 A1 * | 4/2006 | Powers et al. | 718/100 |
| 2006/0080389 A1 * | 4/2006 | Powers et al. | 709/203 |

(Continued)

OTHER PUBLICATIONS

U.S. Appl. No. 60/828,192, filed Oct. 4, 2006.

*Primary Examiner* — Thanh-Ha Dang
(74) *Attorney, Agent, or Firm* — Zilka-Kotab, PC (57) ABSTRACT

In accordance with embodiments, there are provided mechanisms and methods for selecting amongst a plurality of processes to send a message (e.g. a message for updating an endpoint system, etc.). These mechanisms and methods for selecting amongst a plurality of processes to send a message can enable embodiments to utilize more than one queue for sending such message. The ability of embodiments to provide such multi-process feature can, in turn, prevent latency that typically accompanies a mounting number of messages.

32 Claims, 9 Drawing Sheets

U.S. PATENT DOCUMENTS

| | | | |
|---|---|---|---|
| 2006/0095274 A1* | 5/2006 | Phillips et al. | 705/1 |
| 2006/0099936 A1* | 5/2006 | Link et al. | 455/414.1 |
| 2006/0106732 A1* | 5/2006 | Coley et al. | 705/59 |
| 2006/0112398 A1* | 5/2006 | Mukkamala et al. | 719/316 |
| 2006/0178910 A1* | 8/2006 | Eisenberger et al. | 705/3 |
| 2006/0194595 A1* | 8/2006 | Myllynen et al. | 455/466 |
| 2006/0206834 A1 | 9/2006 | Fisher et al. | 715/777 |
| 2006/0294311 A1* | 12/2006 | Fu et al. | 711/118 |
| 2007/0226755 A1* | 9/2007 | Kilian-Kehr | 719/318 |
| 2008/0065769 A1* | 3/2008 | Curtis et al. | 709/226 |
| 2009/0239544 A1* | 9/2009 | Myllynen et al. | 455/445 |
| 2011/0161419 A1* | 6/2011 | Chunilal | 709/204 |

* cited by examiner

METHOD AND SYSTEM FOR SELECTING AMONGST A PLURALITY OF PROCESSES TO SEND A MESSAGE

CLAIM OF PRIORITY

This application claims the benefit of U.S. Provisional Patent Application 60/827,871 entitled Method And System For Automatically Sending Messages From An On-Demand Database Service, by Jasik et al., filed Oct. 2, 2006, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to generating messages for a variety of reasons in a database network system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request.

During use of the aforementioned systems, data is constantly being updated. Typically, this is accomplished by sending a message from a database server system to an endpoint system that prompts such update. In situations where such messages are automatically triggered in a blanket manner (e.g. for every change made, etc.), the number of messages being sent can quickly grow, thereby causing bandwidth problems, etc. While associated server systems often queue such large amount of messages, they typically do so using a single queue which often falls to address growing latency that accompanies a mounting number of messages. There is thus a need for addressing these and/or other issues.

BRIEF SUMMARY

In accordance with embodiments, there are provided mechanisms and methods for selecting amongst a plurality of processes to send a message (e.g. a message for updating an endpoint system, etc.). These mechanisms and methods for selecting amongst a plurality of processes to send a message can enable embodiments to utilize more than one queue for sending such message. The ability of embodiments to provide such multi-process feature can, in turn, prevent latency that typically accompanies a mounting number of messages.

In an embodiment and by way of example, a method for selecting amongst a plurality of processes to send a message is provided. The method embodiment includes detecting a trigger for automatically sending a message in association with a subscriber of an on-demand database service. In use, message information is retrieved from a portion of a database being managed by the on-demand database service. Further, at least one of a plurality of processes is selected for sending the message and the message information.

While the present invention is described with reference to an embodiment in which techniques for selecting amongst a plurality of processes to send a message are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

General Overview

Systems and methods are provided for selecting amongst a plurality of processes to send a message (e.g. a message for updating an endpoint system, etc.).

During use of database systems, data is constantly being updated. Typically, this is accomplished by sending a message from a database server system to an endpoint system that prompts such update. The number of messages being sent can quickly grow, particularly in situations where such messages are automatically triggered in a blanket manner (e.g. for every change made, etc.), thereby causing bandwidth problems, etc.

Thus, mechanisms and methods are provided for selecting amongst a plurality of processes to send a message which can, in turn, enable embodiments to utilize more than one queue for sending such message. The ability of embodiments to provide such multi-process feature can, in turn, prevent latency that typically accompanies a mounting number of messages.

Next, mechanisms and methods for providing such ability to select amongst a plurality of processes to send a message will be described with reference to example embodiments.

Figure 1:
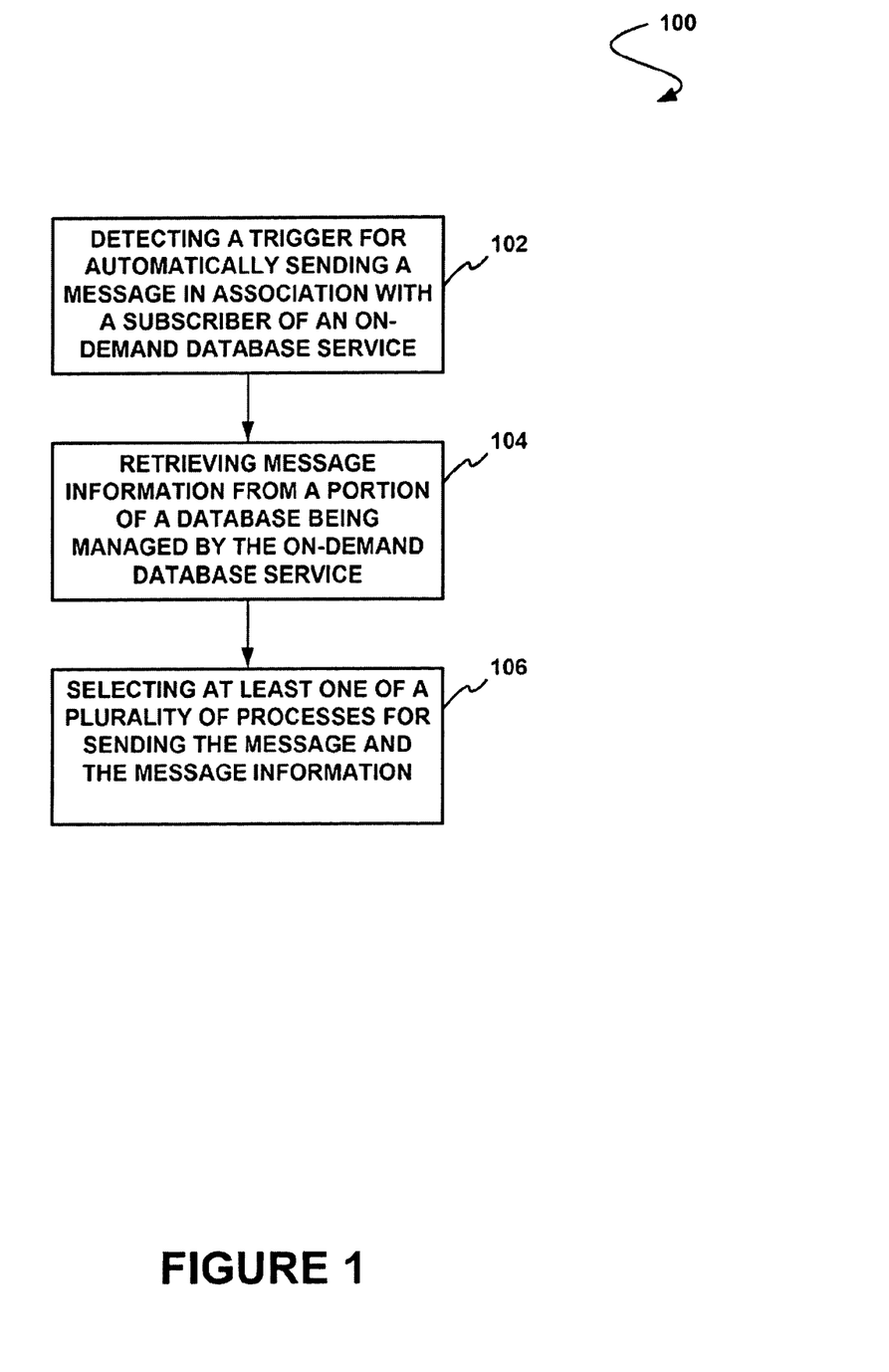
FIG. 1 illustrates a method for selecting amongst a plurality of processes to send a message, in accordance with one embodiment.

FIG. 1 illustrates a method 100 for selecting amongst a plurality of processes to send a message, in accordance with one embodiment. In operation 102, a trigger is detected for automatically sending a message in association with a subscriber of an on-demand database service. In one embodiment, the aforementioned on-demand database service may include a multi-tenant database system. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

In the context of the present description, the message may include any data structure that is capable of being used to communicate message information in the manner set forth below. In one possible embodiment, the purpose of the message may be to update a database (e.g. of an endpoint system, etc.) associated with the subscriber. For example, the message may reflect at least one change (e.g. an addition, deletion, modification, etc.) to be made to such database. In another possible embodiment, the message may be generated utilizing a web service definition language (WSDL) including customized fields, etc. Further, the trigger may include any event that results in the message being automatically sent.

Next, in operation 104, message information is retrieved from a portion of a database being managed by the on-demand database service. In the aforementioned embodiment where the on-demand database service includes a multi-tenant database system, the foregoing portion of the database may be that which corresponds to the particular subscriber associated with the trigger. In the present description, the message information may include any data capable of being stored by the database being managed by the on-demand database service.

At least one of a plurality of processes is further selected for sending the message and the message information. See operation 106. Such processes may include any processes that are capable of resulting in the message being sent. In one embodiment, the message and/or the message information (or any other data structure) may be queued in one or more queues associated with the particular selected process.

Further, in various embodiments, the processes may differ in at least one respect. For example, in one embodiment, a first one of the processes may be capable of processing the message faster than a second one of the processes. As an option, the processes may or may not result in the message and associated information being sent over a network (e.g. the Internet, etc.). As an option, the message may be sent using any desired protocol including, but certainly not limited to a simple object access protocol (SOAP), TCP/IP, HTTPS, etc.

In different embodiments, the selection of the processes may be based on any desired criteria. For example, such criteria may be a function of the subscriber, the service, the message (e.g. type, size, etc.), etc. Additional information regarding various examples of such criteria will be set forth later during the description of different embodiments illustrated in subsequent figures.

In any case, by providing multiple processes by which the message may be sent, the method 100 may be more apt to manage a larger number of messages. This may, in turn, help prevent latency that typically accompanies a mounting number of messages.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
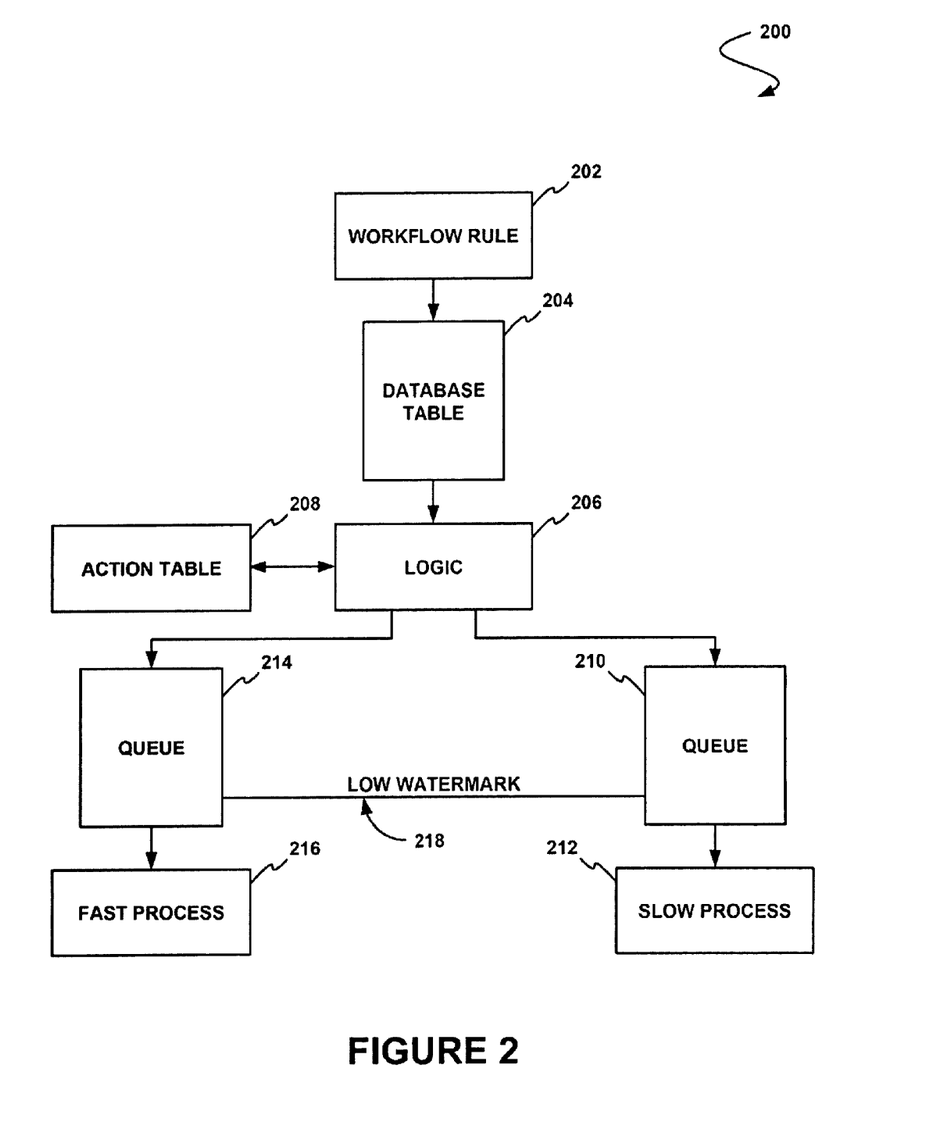
FIG. 2 shows a system for selecting amongst a plurality of processes to send a message, in accordance with one embodiment.

FIG. 2 shows a system 200 for selecting amongst a plurality of processes to send a message, in accordance with one embodiment. As an option, the present system 200 may be implemented to carry out the method 100 of FIG. 1, for example. Of course, however, the system 200 may be implemented in any desired environment. It should also be noted that the aforementioned definitions may apply during the present description.

As shown, a workflow rule 202 is included for triggering a message to be sent. In one embodiment, the workflow rule 202 may initiate such trigger as a result of a change to data in a database of an associated on-demand database service. As will soon become apparent, it may be desired to propagate such change in the database to a client or server system of the relevant subscriber, by sending the associated message.

In one embodiment, the aforementioned triggering may be governed by a plurality of rules that may or may not be subscriber-configurable. Additional descriptions relating to exemplary operation of the workflow rule 202 will be set forth during the description of a different embodiment illustrated in FIG. 5.

As further shown, a database table 204 is provided. In response to the trigger of the workflow rule 202, the database table 204 is populated with various information that, in turn, enables the creation of the appropriate message. More information regarding one possible database table will be set forth during the description of a different embodiment illustrated in FIG. 3.

Further included is logic 206 for interfacing with the database table 204. Such logic 206 serves to retrieve and update information in the database table 204 for the purpose of selecting among a plurality of processes to generate the appropriate message. In one embodiment, such logic 206 may be implemented in the context of a batch server or the like.

Figure 6:
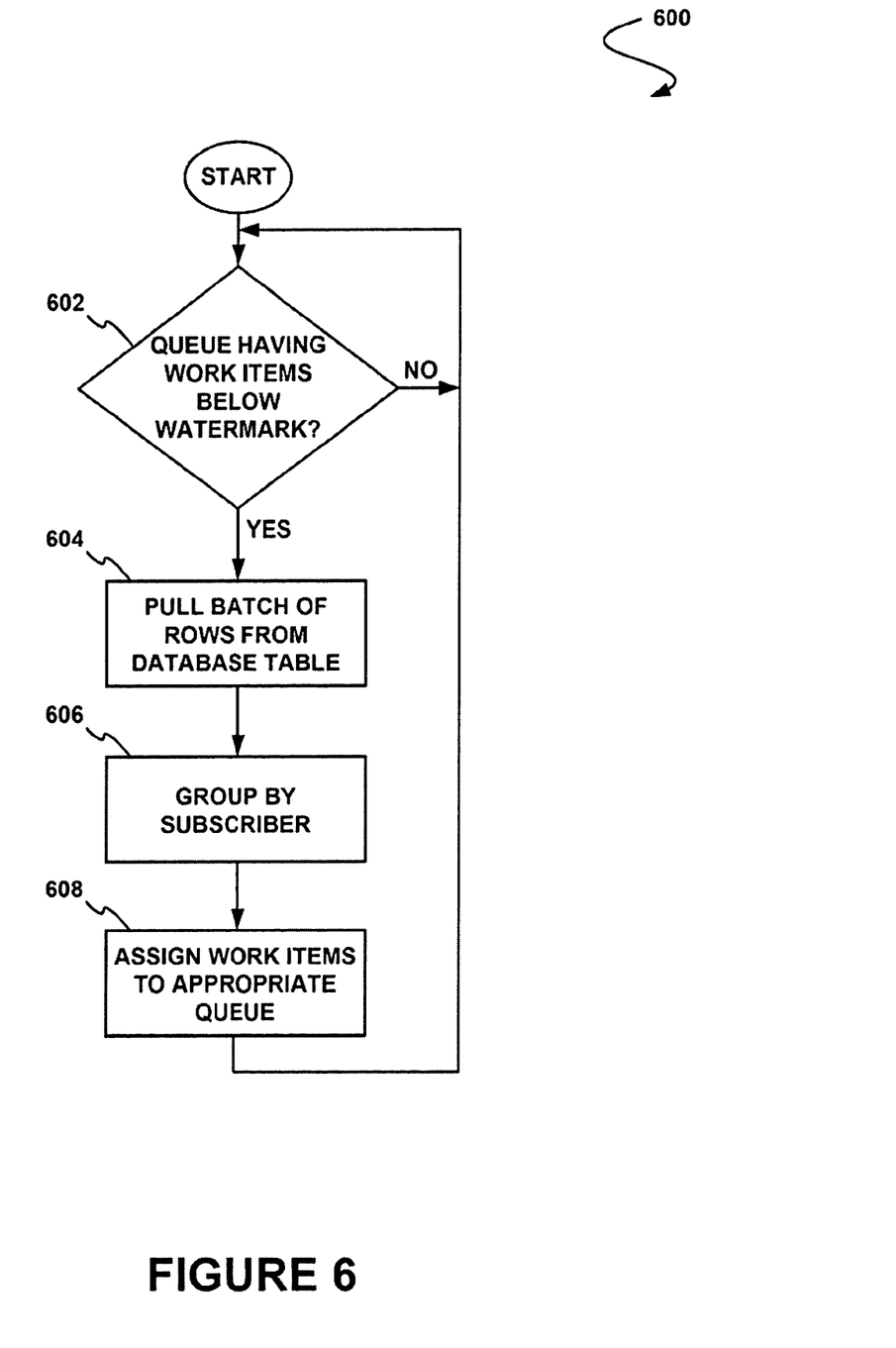
FIG. 6 shows a method for selecting a process to send a message, in accordance with one embodiment.

More information regarding exemplary operation of the logic 206 will be set forth during the description of a different embodiment shown in FIG. 6.

Further, the logic 206 performs this task under the direction of an action table 208. To accomplish this, the action table 208 may include various information, rules, etc. that indicate which of the processes should be selected under which conditions, etc. Additional information regarding one possible action table 208 will be set forth during the description of a different embodiment illustrated in FIG. 4.

To accomplish this, the logic 206 feeds work items to a plurality of queues 210, 214 that feed respective processes 212, 216. As shown, the processes 212, 216 may include a slow process 212 and a fast process 216. While two processes 212, 216 are shown, it should be noted that other embodiments are contemplated equipped with more processes. For example, additional processes that exhibit different speeds or other characteristics may be provided.

As will soon become apparent, the processes 212, 216 serve to generate and send messages and associated information to a remote subscriber device for the purpose of updating data thereon. Further, for reasons that will soon become apparent, a watermark 218 is provided in conjunction with each of the queues 210, 214 to indicate when work items have fallen below a predetermined number. More information regarding exemplary operation of the processes 212, 216 will be set forth during the description of a different embodiment shown in FIG. 7.

Figure 3:
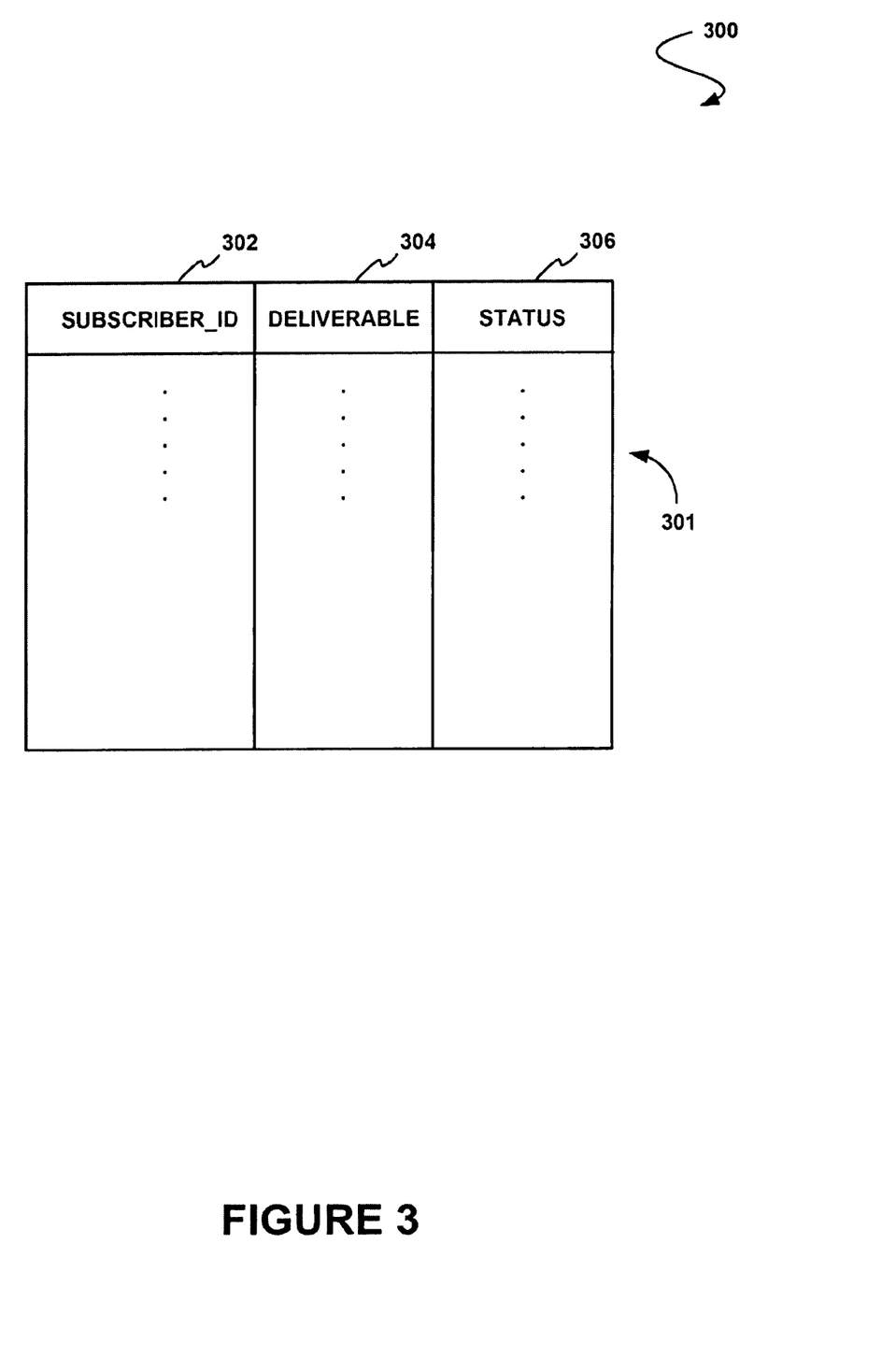
FIG. 3 shows a database table for being used to generate messages, in accordance with another embodiment.

FIG. 3 shows a database table 300 for being used to generate messages, in accordance with another embodiment. As an option, the database table 300 may be implemented to carry out the method 100 of FIG. 1 in the context of the system 200 of FIG. 2. For example, the database table 204 of FIG. 2 may take the form of the database table 300. Of course, however, the database table 300 may be used in any desired environment. Again, the aforementioned definitions may apply during the present description.

As illustrated, the database table 300 may include a plurality of rows 301 that each correspond with an associated message to be sent. In one embodiment, each of the rows 301 may be created and/or populated in response to a trigger prompted by any desired mechanism (e.g. the workflow rule 204 of FIG. 2).

As shown, each row 301 may include a subscriber identifier 302 that uniquely identifies a subscriber for which a message is to be sent. Each row 301 may also include a deliverable 304 that indicates various information to be sent in conjunction with the message. For example, the information may include a pointer identifying a location of data that has been changed in an associated database. In various embodiments, each row 301 may reflect a single change or a large number of changes (for consolidation of messages, etc.). As an option, each of the rows may be exposed (via a user interface, etc.) to the corresponding subscriber, so that the subscriber can view the relevant contents, and even delete desired rows.

For reasons that will soon become apparent, a status 306 is also stored in association with each message-specific row. Such status 306 may indicate, for instance, whether the associated message has being assigned to a process (e.g. the processes 212, 214) for generation/transmission, etc. in another possible embodiment, the status 306 need not necessarily be included in the database table 300 and, instead, two or more database tables may be included. Specifically, a first database table may be populated by the workflow rule(s), and a second pending database table may be used to retrieve rows from the first database table to operate upon.

Figure 4:
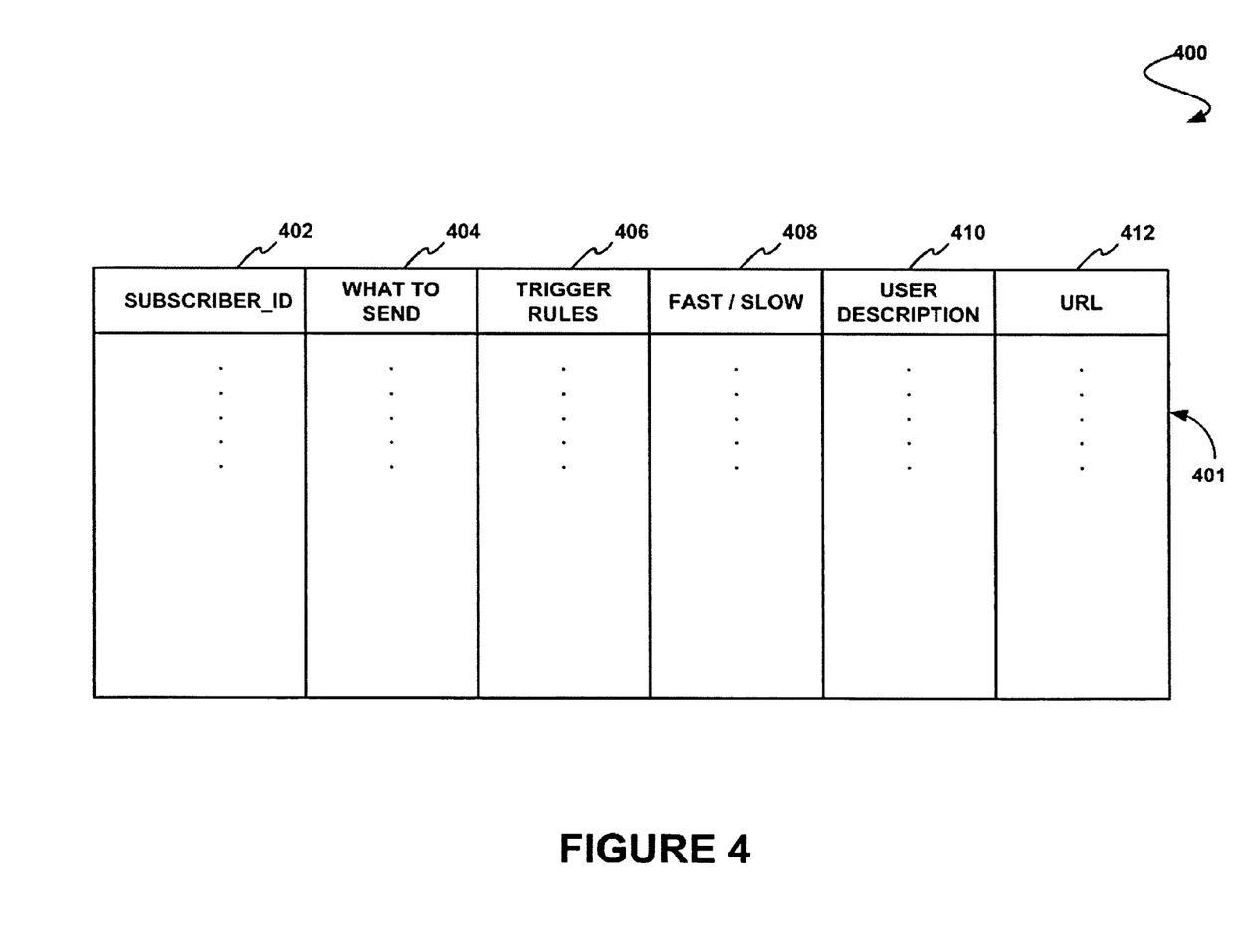
FIG. 4 shows an action table for being used to control the selection of a process to send a message, in accordance with another embodiment.

FIG. 4 shows an action table 400 for being used to control the selection of a process to send a message, in accordance with another embodiment. As an option, the action table 400 may be implemented to carry out the method 100 of FIG. 1 in the context of the system 200 of FIG. 2. For example, the action table 208 of FIG. 2 may take the form of the action table 400. Of course, however, the action table 400 may be used in any desired environment. Yet again, the aforementioned definitions may apply during the present description.

As shown, the action table 400 may include a plurality of rows 401 that each correspond with an associated subscriber. In use, various logic (e.g. logic 206 of FIG. 2) may use the action table 400 for determining which of a plurality of processes should receive a work item to generate and/or send a message.

To accomplish this, each of the rows 401 includes a subscriber identifier 402 as well as what information (see item 404) should be sent with each message. Such information may vary on a subscriber-by-subscriber basis, and thus may be dictated accordingly. Further included is one or more triggering rules 406 to indicate under what conditions a message work item should be generated and assigned to an associated process. It should be noted that the triggering rules 406 may or may not necessarily be the same as the triggers that initiated the message generation procedure (e.g. by the workflow rule 204 of FIG. 2).

Still yet, the rows 401 may each further include a process indicator 408 for identifying which of the processes should receive the work item (and associated information per item 404) when appropriate per the triggering rule(s) 406. For example, in the context of the system 200 of FIG. 2, the process indicator 408 may indicate the slow process 212 or the fast process 216. In various embodiments, each of the subscribers may be assigned different processes based on various criteria.

For example, in one embodiment, each of the subscribers may be initially assigned, by default, to a fast process. Then, depending on various subscriber-specific performance factors, the subscribers may be later assigned to the slow process, by updating the process indicator 408 accordingly. For instance, a subscriber may be eligible for such a change if a system of such subscriber fails to respond to/acknowledge messages, etc. within a predetermined amount of time (with such happening a threshold number of times, etc.). In such case, the subscriber may be thereafter assigned to the slow process. In one embodiment, all of the messages associated with the particular subscriber may be assigned to the slow process in the event that one or more of the messages cause the foregoing threshold to be met. Thus, in various embodiments, the appropriate process may be selected based on a subscriber of the on-demand database service. Specifically, the process may be selected based on a past behavior (e.g. response time, etc.) of the subscriber of the on-demand database service, etc.

Of course, a mechanism may be put in place to allow the subscribers to earn back their fast process status. As will soon become apparent, such feature ensures that subscribers that negatively impact a speed of the fast process may thus be assigned to a slow process.

Still yet, various other information may be included in the action table 400, such as a user description 410 as well as a destination 412 to which the message is to be sent. Such destination 412 may, in one embodiment, include a uniform resource locator (URL) associated with the particular subscriber indicated by the subscriber identifier 402.

Figure 5:
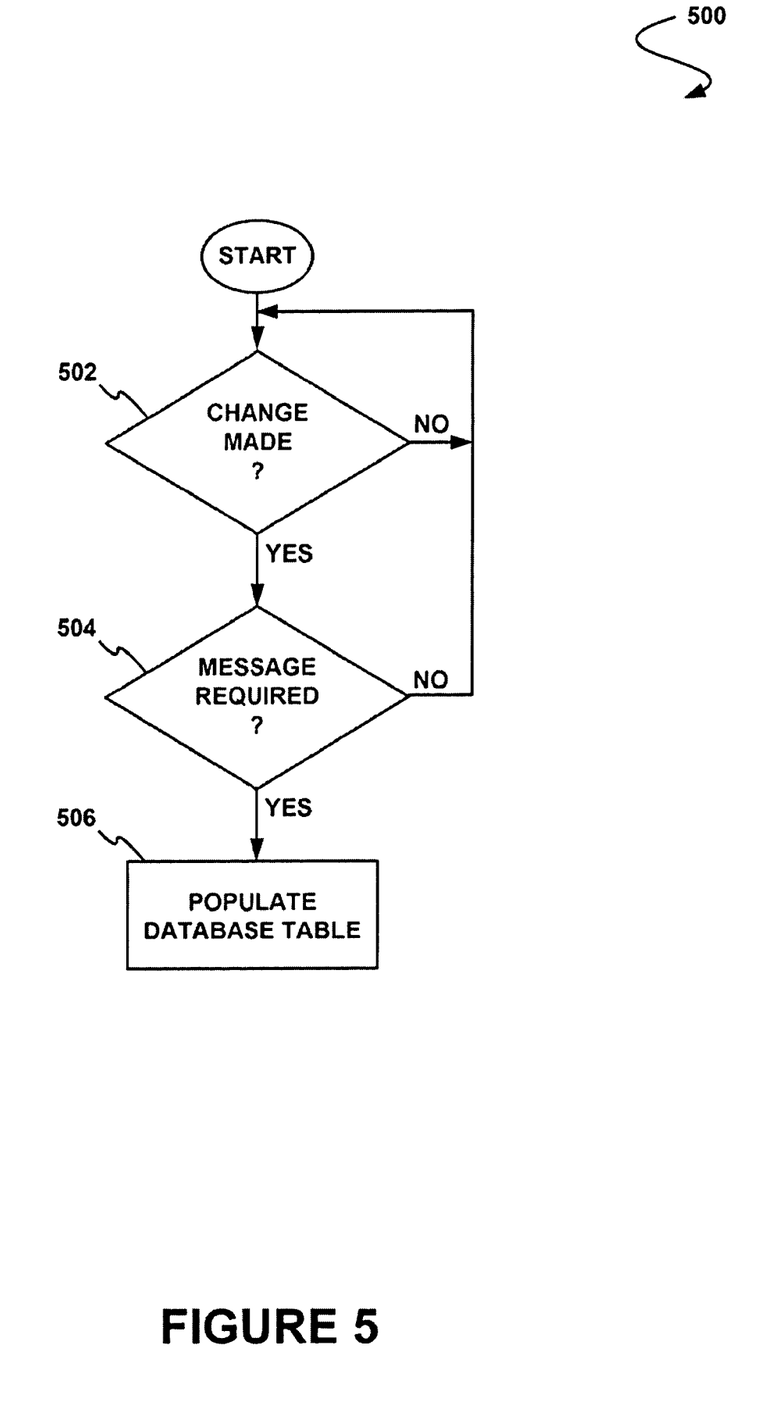
FIG. 5 shows a method for populating a database table, in accordance with one embodiment.

FIG. 5 shows a method 500 for populating a database table, in accordance with one embodiment. As an option, the present method 500 may be implemented in the context of the architecture and/or functionality of FIGS. 1-4. For example, the method 500 may represent exemplary operation of the workflow rule 202 of FIG. 2. Of course, however, the method 500 may be implemented in any desired environment. Yet again, it should also be noted that the aforementioned definitions may apply during the present description.

As shown, it may be determined first if a change has been made to a database associated with an on-demand database service. See decision 502. In various embodiments, such change may reflect an addition of data, a deletion of data, a modification of data, etc. Further, such change may result from any manual and/or automatic process that may or may not be subscriber-specific.

If it is determined that a change has indeed been made per decision 502, it is then determined whether a message is required. See decision 504. In one embodiment, a message may not necessarily be generated for each change. For example, in certain circumstances, a message may not necessarily be generated for certain types of changes (e.g. those of less importance/relevance, those generated by certain users, etc.). In various embodiments, the foregoing circumstances may be configured by the subscriber, utilizing a user interface. In another embodiment, such decision may be dictated by various triggering rules associated with an action table (e.g. triggering rules 406 of the action table 400 of FIG. 4). Thus, message information may be conditionally retrieved, based on the determined type of the change made to the database. This may be accomplished for a variety purpose such as saving bandwidth that would otherwise be impacted by a large number of messages, etc.

Further, such decision 504 may be different for different subscribers. In other words, a plurality of the triggers may be different for a plurality of different subscribers of the on-demand database service. To enforce such subscriber-specific decision making process, each change may be authenticated with a subscriber identifier.

Thus, if it is determined a change is made per decision 502 and that such change warrants the generation of a message per decision 504, a database table (e.g. database table 204 of FIG. 2) may be populated for the purpose of initiating the message generation process under the control of various logic (e.g. logic 206). See operation 506. To this end, the operation to populate the database table may serve to queue the messages before being retrieved for processing by logic. More information regarding exemplary operation of such logic will now be set forth, according to embodiment illustrated in FIG. 6.

FIG. 6 shows a method 600 for selecting a process to send a message, in accordance with one embodiment. As an option, the method 600 may be implemented in the context of the architecture and/or functionality of FIGS. 1-5. For example, the method 600 may represent exemplary operation of the logic 206 of FIG. 2. Of course, however, the method 500 may be implemented in any desired environment. Still yet again, the aforementioned definitions may apply during the present description.

It is first determined in decision 602 whether a queue (e.g. queues 210, 214 of FIG. 2) of work items have fallen below a watermark (e.g. watermark 218). In such a situation, it can be concluded that various related processes (e.g. the processes 212, 216) may soon be running idle without work items to process for the purpose of generating associated messages.

If it is determined in decision 602 that a queue will soon be empty, a batch of additional rows may be pulled from a database table (e.g. database table 204 of FIG. 2 or database table 300 of FIG. 3). See operation 604. It should be noted that which of the rows are pulled may depend on the particular queue that will soon be empty. For example, if a queue associated with a slow process is emptying, rows associated with messages earmarked for the slow process may be pulled (instead of others that are earmarked for a fast process). Further, rows associated with certain subscribers may be pulled before others based on various triggering Rules, etc. (e.g. triggering rules 406 of FIG. 4).

Next, as an option, messages represented by the batch of rows may be grouped according to an associated subscriber of the on-demand database service. See operation 606. In one embodiment, a subscriber identifier (e.g. subscriber identifier 302 of FIG. 3) may be used for such grouping.

To this end, each message work item may be stored in a queue associated with the appropriate process, in response to the selection thereof. Specifically, based on a process associated with each subscriber, the relevant message work items may be assigned to and stored in the appropriate (e.g. fast/slow) queue, before being processed. Note operation 608. Once assigned to the appropriate queue, the work items are then ready for processing by the corresponding process. More information regarding exemplary operation of such logic will now be set forth, according to embodiment illustrated in FIG. 7.

Figure 7:
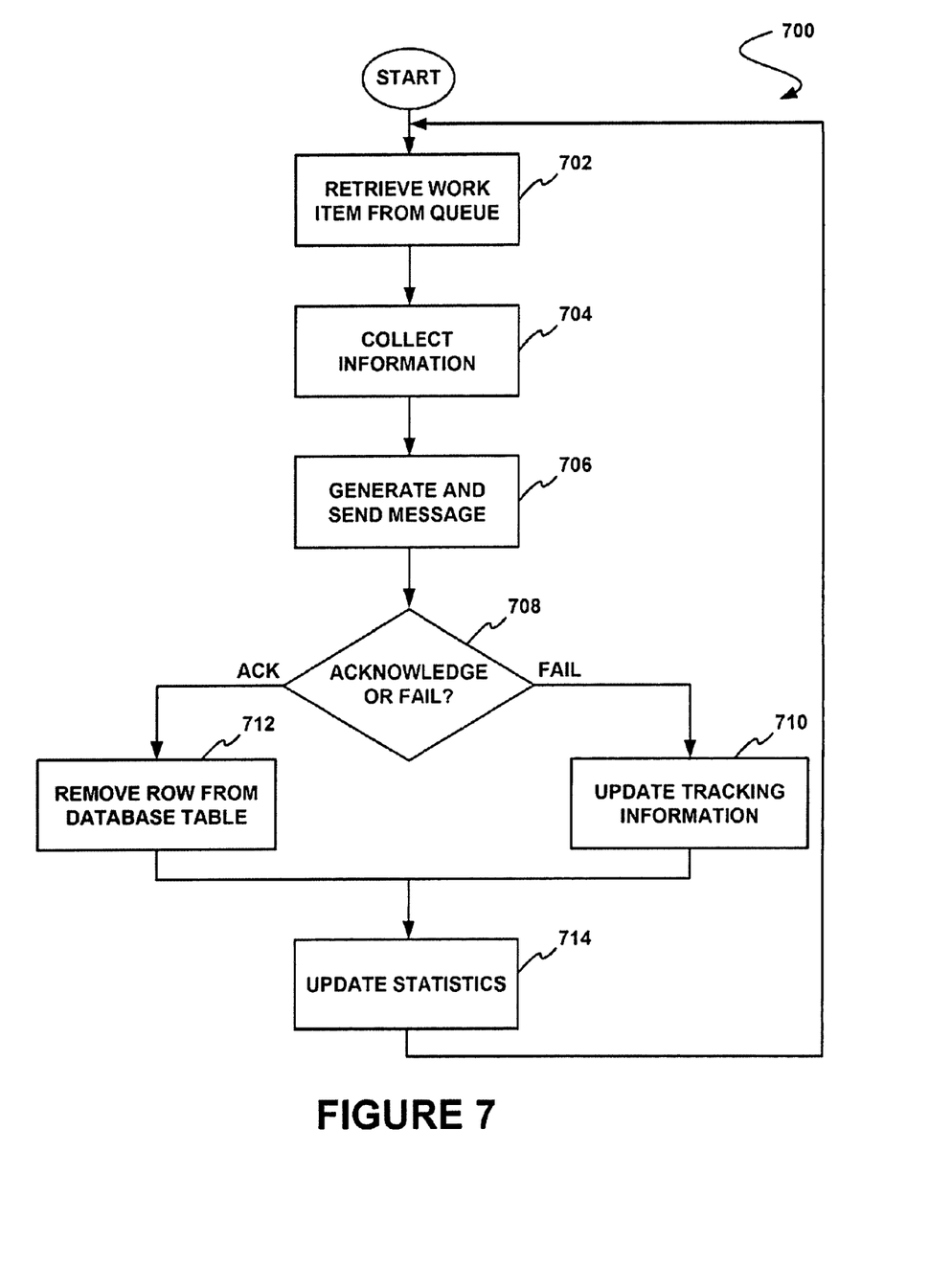
FIG. 7 shows a method for generating and sending a message, in accordance with one embodiment.

FIG. 7 shows a method 700 for generating and sending a message, in accordance with one embodiment. As an option, the method 700 may be implemented in the context of the architecture and/or functionality of FIGS. 1-6. For example, the method 700 may represent exemplary operation of either oft the processes 212, 216 of FIG. 2. As an additional option, such processes may include multiple (e.g. six) threads carrying out the method 700 in parallel. Of course, however, the method 700 may be implemented in any desired environment. Still yet again, the aforementioned definitions may apply during the present description.

As shown, a work item is retrieved from a queue (e.g. queues 210, 214 of FIG. 2). See operation 702. In response, the appropriate information is collected, per operation 704. Specifically, the associated process may retrieve message information from a relevant portion of the database.

Armed with such information, the method 700 continues by generating and sending the message. See operation 706. In one embodiment, this may be accomplished by using the associated row to identify the information to be sent with the message.

It is then determined whether an acknowledgement or a failure is received in response to the message. See decision 708. If the acknowledgement is received, the relevant rows associated with the message work item may be removed from the database table, as indicated in operation 712. On the other hand, if the failure is received, tracking information (e.g. status 306 of FIG. 3) associated with the message work item is updated to reflect the same, as indicated in operation 710.

In one embodiment, any retries for sending the message may be spaced out to mitigate any negative impact on processing resources. For example, a first retry may be subject to a first delay, and a second retry may be subject to a second delay that is longer than the first delay, and so on. In one embodiment, a subscriber may manually initiate a retry in real-time (for improved ability to perform diagnostics). To avoid any queue overflow, any pending message (to which there is no response) may be simply discarded or re-queued, etc.

In any case, the process further collects data on such responses to the sent message information, for reporting purposes. In one embodiment, such data may be compiled for statistical analysis. See operation 714. As an option, such statistical analysis may serve as historical data to be used to determine which of a plurality of processes is appropriate for a particular subscriber, as set forth earlier.

System Overview

Figure 8:
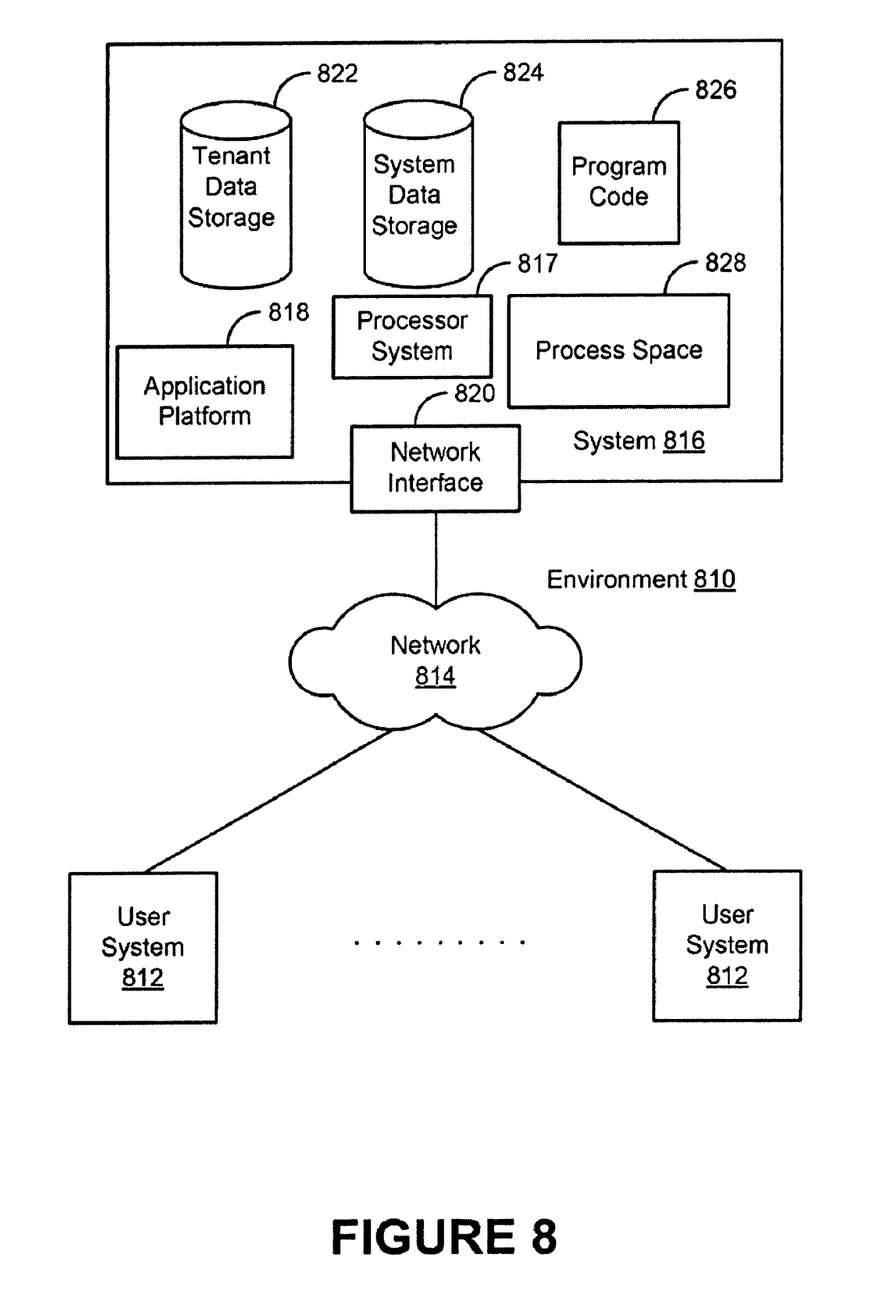
FIG. 8 illustrates a block diagram of an example of an environment wherein an on-demand database service might be used.

FIG. 8 illustrates a block diagram of an environment 810 wherein an on-demand database service might be used. Environment 810 may include user systems 812, network 814, system 816, processor system 817, application platform 818, network interface 820, tenant data storage 822, system data storage 824, program code 826, and process space 828. In other embodiments, environment 810 may not have all of the components listed and/or may have other elements instead of, or in addition to, those listed above.

Environment 810 is an environment in which an on-demand database service exists. User system 812 may be any machine or system that is used by a user to access a database user system. For example, any of user systems 812 can be a handheld computing device, a mobile phone, a laptop computer, a work station, and/or a network of computing devices. As illustrated in FIG. 8 (and in more detail in FIG. 9) user systems 812 might interact via a network with an on-demand database service, which is system 816.

An on-demand database service, such as system 816, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 816" and "system 816" will be used interchangeably herein. A database image may include one or more database objects. A relational database management system (RDMS) or the equivalent may execute storage and retrieval of information against the database object(s). Application platform 818 may be a framework that allows the applications of system 816 to run, such as the hardware and/or software, e.g., the operating system. In an embodiment, on-demand database service 816 may include an application platform 818 that enables creation, managing and executing one or more applications developed by the provider of the on-demand database service, users accessing the on-demand database service via user systems 812, or third party application developers accessing the on-demand database service via user systems 812.

The users of user systems 812 may differ in their respective capacities, and the capacity of a particular user system 812 might be entirely determined by permissions (permission levels) for the current user. For example, where a salesperson is using a particular user system 812 to interact with system 816, that user system has the capacities allotted to that salesperson. However, while an administrator is using that user system to interact with system 816, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 814 is any network or combination of networks of devices that communicate with one another. For example, network 814 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 812 might communicate with system 816 using TCP/IP and, at a higher network level, use other common Internet protocols to communicate, such as HTTP, FTP, AFS, WAP, etc. In an example where HTTP is used, user system 812 might include an HTTP client commonly referred to as a "browser" for sending and receiving HTTP messages to and from an HTTP server at system 816. Such an HTTP server might be implemented as the sole network interface between system 816 and network 814, but other techniques might be used as well or instead. In some implementations, the interface between system 816 and network 814 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 816, shown in FIG. 8, implements a web-based customer relationship management (CRM) system. For example, in one embodiment, system 816 includes application servers configured to implement and execute CRM software applications as well as provide related data, code, forms, webpages and other information to and from user systems 812 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 816 implements applications other than, or in addition to, a CRM application. For example, system 816 may provide tenant access to multiple hosted (standard and custom) applications, including a CRM application. User (or third party developer) applications, which may or may not include CRM, may be supported by the application platform 818, which manages creation, storage of the applications into one or more database objects and executing of the applications in a virtual machine in the process space of the system 816.

Figure 9:
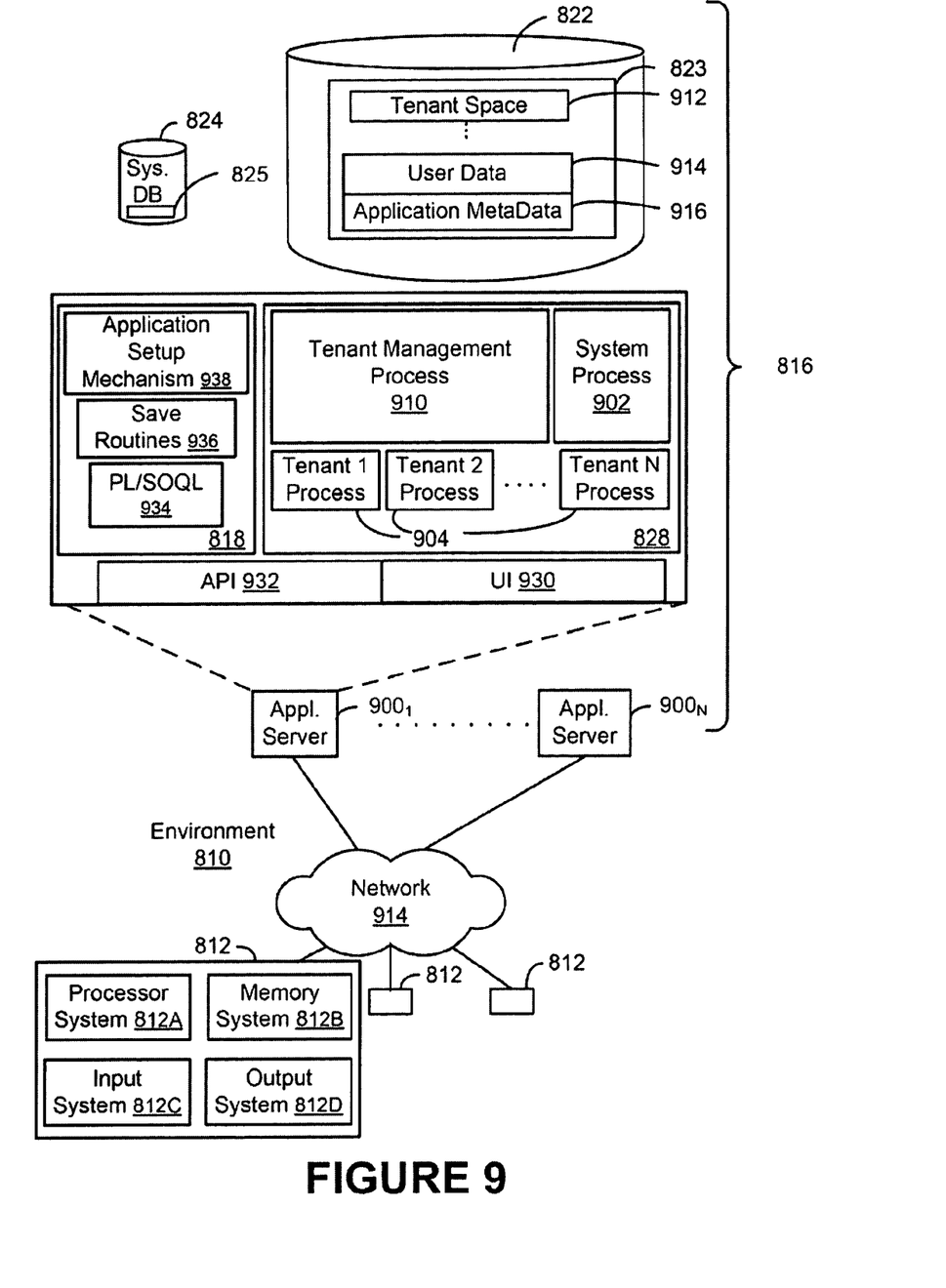
FIG. 9 illustrates a block diagram of an embodiment of elements of FIG. 8 and various possible interconnections between these elements.

One arrangement for elements of system 816 is shown in FIG. 9, including a network interface 820, application platform 818, tenant data storage 822 for tenant data 823, system data storage 824 for system data accessible to system 816 and possibly multiple tenants, program code 826 for implementing various functions of system 816, and a process space 828 for executing MTS system processes and tenant-specific processes, such as running applications as part of an application hosting service. Additional processes that may execute on system 816 include database indexing processes.

Several elements in the system shown in FIG. 8 include conventional, well-known elements that are explained only briefly here. For example, each user system 812 could include a desktop personal computer, workstation, laptop, PDA, cell phone, or any wireless access protocol (WAP) enabled device or any other computing device capable of interfacing directly or indirectly to the Internet or other network connection. User system 812 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 812 to access, process and view information, pages and applications available to it from system 816 over network 814. Each user system 812 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 816 or other systems or servers. For example, the user interface device can be used to access data and applications hosted by system 816, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 812 and all of its components are operator configurable using applications, such as a browser, including computer code run using a central processing unit such as an Intel Pentium® processor or the like. Similarly, system 816 (and additional instances of an MTS, where more than one is present) and all of their components might be operator configurable using application(s) including computer code to run using a central processing unit such as processor system 817, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 816 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 816 is configured to provide webpages, forms, applications, data and media content to user (client) systems 812 to support the access by user systems 812 as tenants of system 816. As such, system 816 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 9 also illustrates environment 810. However, in FIG. 9 elements of system 816 and various interconnections in an embodiment are further illustrated. FIG. 9 shows that user system 812 may include processor system 812A, memory system 812B, input system 812C, and Output system 812D. FIG. 9 shows network 814 and system 816. FIG. 9 also shows that system 816 may include tenant data storage 822, tenant data 823, system data storage 824, system data 825, User Interface (UI) 930, Application Program Interface (API) 932, PL/SOQL 934, save routines 936, application setup mechanism 938, applications servers $900_1$-$900_N$, system process space 902, tenant process spaces 904, tenant management process space 910, tenant storage area 912, user storage 914, and application metadata 916. In other embodiments, environment 810 may not have the same elements as those listed above and/or may have other elements instead of, or in addition to, those listed above.

User system 812, network 814, system 816, tenant data storage 822, and system data storage 824 were discussed above in FIG. 8. Regarding user system 812, processor system 812A may be any combination of one or more processors. Memory system 812B may be any combination of one or more memory devices, short term, and/or long term memory. Input system 812C may be any combination of input devices, such as one or more keyboards, mice, trackballs, scanners, cameras, and/or interfaces to networks. Output system 812D may be any combination of output devices, such as one or more monitors, printers, and/or interfaces to networks. As shown by FIG. 9, system 816 may include a network interface 820 (of FIG. 8) implemented as a set of HTTP application servers 900, an application platform 818, tenant data storage 822, and system data storage 824. Also shown is system process space 902, including individual tenant process spaces 904 and a tenant management process space 910. Each application server 900 may be configured to tenant data storage 822 and the tenant data 823 therein, and system data storage 824 and the system data 825 therein to serve requests of user systems 812. The tenant data 823 might be divided into individual tenant storage areas 912, which can be either a physical arrangement and/or a logical arrangement of data. Within each tenant storage area 912, user storage 914 and application metadata 916 might be similarly allocated for each user. For example, a copy of a user's most recently used (MRU) items might be stored to user storage 914. Similarly, a copy of MRU items for an entire organization that is a tenant might be stored to tenant storage area 912. A UI 930 provides a user interface and an API 932 provides an application programmer interface to system 816 resident processes to users and/or developers at user systems 812. The tenant data and the system data may be stored in various databases, such as one or more Oracle™ databases.

Application platform 818 includes an application setup mechanism 938 that supports application developers' creation and management of applications, which may be saved as metadata into tenant data storage 822 by save routines 936 for execution by subscribers as one or more tenant process spaces 904 managed by tenant management process 910 for example. Invocations to such applications may be coded using PL/SOQL 34 that provides a programming language style interface extension to API 932. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 916 for the subscriber making the invocation and executing the metadata as an application in a virtual machine.

Each application server 900 may be communicably coupled to database systems, e.g., having access to system data 825 and tenant data 823, via a different network connection. For example, one application server 900, might be coupled via the network 814 (e.g., the Internet), another application server $900_{N-1}$ might be coupled via a direct network link, and another application server $900_N$ might be coupled by yet a different network connection. Transfer Control Protocol and Internet Protocol (TCP/IP) are typical protocols for communicating between application servers 900 and the database system. However, it will be apparent to one skilled in the art that other transport protocols may be used to optimize the system depending on the network interconnect used.

In certain embodiments, each application server 900 is configured to handle requests for any user associated with any organization that is a tenant. Because it is desirable to be able to add and remove application servers from the server pool at any time for any reason, there is preferably no server affinity for a user and/or organization to a specific application server 900.

In one embodiment, therefore, an interface system implementing a load balancing function (e.g., an F5 Big-IP load balancer) is communicably coupled between the application servers 900 and the user systems 812 to distribute requests to the application servers 900. In one embodiment, the load balancer uses a least connections algorithm to route user requests to the application servers 900. Other examples of load balancing algorithms, such as round robin and observed response time, also can be used. For example, in certain embodiments, three consecutive requests from the same user could hit three different application servers 900, and three requests from different users could hit the same application server 900. In this manner, system 816 is multi-tenant, wherein system 816 handles storage of, and access to, different objects, data and applications across disparate users and organizations.

As an example of storage, one tenant might be a company that employs a sales force where each salesperson uses system 816 to manage their sales process. Thus, a user might maintain contact data, leads data, customer follow-up data, performance data, goals and progress data, etc., all applicable to that user's personal sales process (e.g., in tenant data storage 822). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 816 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 816 might also maintain system level data usable by multiple tenants or other data. Such system level data might include industry reports, news, postings, and the like that are sharable among tenants.

In certain embodiments, user systems 812 (which may be client systems) communicate with application servers 900 to request and update system-level and tenant-level data from system 816 that may require sending one or more queries to tenant data storage 822 and/or system data storage 824. System 816 (e.g., an application server 900 in system 816) automatically generates one or more SQL statements (e.g., one or more SQL queries) that are designed to access the desired information. System data storage 824 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method, comprising:
    detecting a trigger including an event that is initiated as a result of at least one change made to data stored in a first database of an on-demand database service;
    in response to the detecting of the trigger, retrieving message information from a portion of a second database being managed by the on-demand database service;
    generating a message utilizing the retrieved message information of the second database and the at least one change made to the data stored in the first database, the generated message including a pointer identifying a location of the data stored in the first database to which the at least one change was made, wherein the message reflects the at least one change made to the data stored in the first database of the on-demand database service;
    selecting at least one of a plurality of processes for sending the generated message and the retrieved message information; and
    sending the generated message and the retrieved message information to a device of a subscriber of the on-demand database service, utilizing the selected at least one of the plurality of processes, for use by the subscriber in propagating the at least one change to the device of the subscriber.

2. The method of claim 1, and further comprising determining a type of the at least one change made to the data stored in the first database.

3. The method of claim 2, wherein the retrieved message information is conditionally retrieved, based on the determined type of the at least one change made to the data stored in the first database.

4. The method of claim 1, wherein the generated message is initiated utilizing a workflow rule.

5. The method of claim 1, wherein each of a plurality of triggers is different for a plurality of different subscribers of the on-demand database service.

6. The method of claim 1, wherein each of a plurality of messages is stored in a queue before being processed.

7. The method of claim 6, wherein each of the plurality of messages is retrieved from the queue for processing.

8. The method of claim 6, wherein the plurality of messages are grouped according to an associated subscriber of the on-demand database service.

9. The method of claim 8, wherein the plurality of messages are grouped utilizing a subscriber identifier.

10. The method of claim 1, wherein a first one of the plurality of processes is configured to process the generated message faster than a second one of the plurality of processes.

11. The method of claim 1, wherein the at least one process is selected based on a past behavior of the subscriber of the on-demand database service associated with the generated message.

12. The method of claim 11, wherein the at least one process is selected based on a response time of the subscriber of the on-demand database service associated with the generated message.

13. The method of claim 1, wherein, in response to the selecting of the at least one process, each of a plurality of messages associated with the subscriber of the on-demand database service is sent utilizing the at least one process.

14. The method of claim 1, wherein, in response to the selecting of the at least one process, each of a plurality of messages is stored in a queue associated with the at least one process.

15. The method of claim 14, wherein the at least one process retrieves the message information from the portion of the second database for each of the plurality of messages, and sends the retrieved message information.

16. The method of claim 1, wherein the at least one process further collects data on responses to the sent message and the sent message information.

17. The method of claim 16, and further comprising reporting the data.

18. The method of claim 1, wherein the trigger is rule-based.

19. The method of claim 1, wherein the generated message is generated utilizing a web service definition language (WSDL).

20. The method of claim 1, wherein the retrieving includes adding a session identifier to the message information.

21. The method of claim 1, wherein the on-demand database service includes a multi-tenant database system.

22. The method of claim 1, wherein the on-demand database service includes an application platform that enables creation, management and execution of one or more applications that are developed by at least one of: a provider of the on-demand database service, users accessing the on-demand database service via user systems, and third party application developers accessing the on-demand database service via the user systems.

23. The method of claim 1, wherein the change includes an addition made to the data stored in a first database of the on-demand database service.

24. The method of claim 1, wherein the trigger is initiated by a rule.

25. The method of claim 24, wherein the rule is configured by the subscriber.

26. The method of claim 25, wherein the rule dictates at least one predetermined type of change to the data stored in the first database of the on-demand database service for which the trigger is initiated, such that the change made to the data stored in the first database of the on-demand database service is of one of the at least one predetermined type of change.

27. The method of claim 1, wherein the change made to the data stored in the first database of the on-demand database service results from a manual process.

28. The method of claim 1, wherein the change made to the data stored in the first database of the on-demand database service is specific to the subscriber.

29. The method of claim 1, wherein the trigger is specific to predetermined types of changes to the data stored in the first database of the on-demand database service.

30. A non-transitory machine-readable medium carrying one or more sequences of instructions which, when executed by one or more processors, cause the one or more processors to carry out the steps of:
- detecting a trigger including an event that is initiated as a result of at least one change made to data stored in a first database of an on-demand database service;
- in response to the detecting of the trigger, retrieving message information from a portion of a second database being managed by the on-demand database service;
- generating a message utilizing the retrieved message information of the second database and the at least one change made to the data stored in the first database, the generated message including a pointer identifying a location of the data stored in the first database to which the at least one change was made, wherein the message reflects the at least one change made to the data stored in the first database of the on-demand database service;
- selecting at least one of a plurality of processes for sending the generated message and the retrieved message information; and
- sending the generated message and the retrieved message information to a device of a subscriber of the on-demand database service, utilizing the selected at least one of the plurality of processes, for use by the subscriber in propagating the at least one change to the device of the subscriber.

31. An apparatus, comprising:
- a processor; and
- one or more stored sequences of instructions which, when executed by the processor, cause the processor to carry out the steps of:
- detecting a trigger including an event that is initiated as a result of at least one change made to data stored in a first database of an on-demand database service;
- in response to the detecting of the trigger, retrieving message information from a portion of a second database being managed by the on-demand database service;
- generating a message utilizing the retrieved message information of the second database and the at least one change made to the data stored in the first database, the generated message including a pointer identifying a location of the data stored in the first database to which the at least one change was made, wherein the message reflects the at least one change made to the data stored in the first database of the on-demand database service;
- selecting at least one of a plurality of processes for sending the generated message and the retrieved message information; and
- sending the generated message and the retrieved message information to a device of a subscriber of the on-demand database service, utilizing the selected at least one of the plurality of processes, for use by the subscriber in propagating the at least one change to the device of the subscriber.

32. A method for transmitting code for use in a multi-tenant database system on a transmission medium, the method comprising:
- transmitting code to detect a trigger including an event that is initiated as a result of at least one change made to data stored in a first database of an on-demand database service;
- transmitting code to, in response to the detecting of the trigger, retrieve message information from a portion of a second database being managed by the on-demand database service;
- transmitting code to generate a message utilizing the retrieved message information of the second database and the at least one change made to the data stored in the first database, the generated message including a pointer identifying a location of the data stored in the first database to which the at least one change was made, wherein the message reflects the at least one change made to the data stored in the first database of the on-demand database service;
- transmitting code to select at least one of a plurality of processes for sending the generated message and the retrieved message information; and
- transmitting code to send the generated message and the retrieved message information to a device of a subscriber of the on-demand database service, utilizing the selected at least one of the plurality of processes, for use by the subscriber in propagating the at least one change to the device of the subscriber.

* * * * *